April 16, 1935. J. E. MICHAUD 1,997,830
WATER PURIFYING DEVICE
Filed Dec. 12, 1932
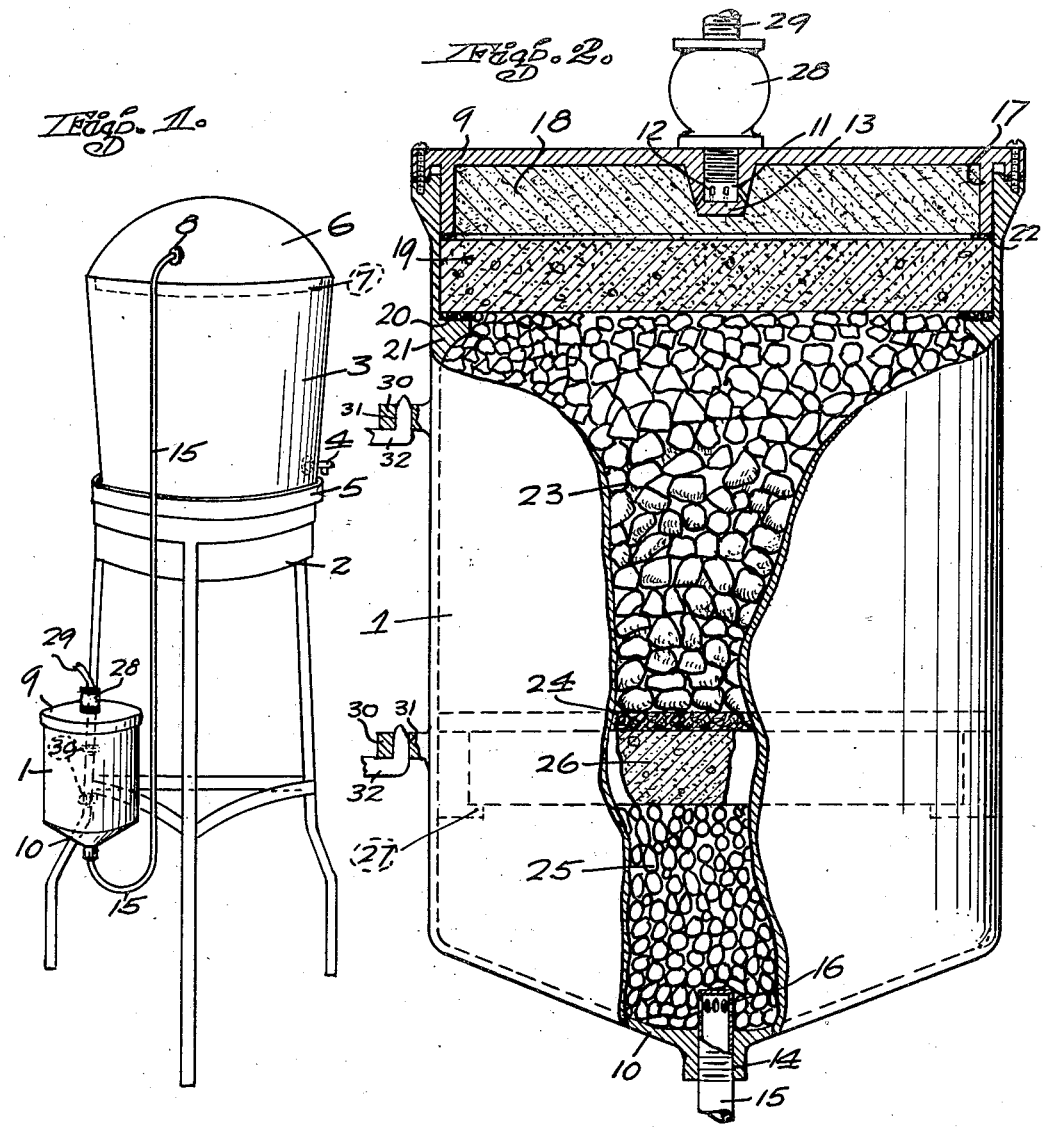
INVENTOR.
JAMES E. MICHAUD
BY George B. White
ATTORNEY.

UNITED STATES PATENT OFFICE 1,997,830

WATER PURIFYING DEVICE

James E. Michaud, San Francisco, Calif.

Application December 12, 1932, Serial No. 646,849

7 Claims. (Cl. 210—103)

This invention relates to an improved water purifier, which is especially designed for use in connection with a water dispenser.

One of the objects of the invention is to provide a simply constructed, inexpensive, small, compact and efficient purifier and filter, which may be readily mounted on a support adjacent a water dispensing receptacle in such manner that little room is taken up, and the bulk of the entire dispensing apparatus is increased but little.

Another object of the invention is to provide a purifier and filter to be interconnected between a source of water supply and a storage or dispensing receptacle or vessel, to purify, filter and clarify the water before the same reaches the dispensing vessel, the purifier and filter being outside of the dispenser vessel and being adapted to operate with water under pressure.

Another object of the invention is to provide a compact water purifier and filter, wherein charcoal or the like is utilized, but in such arrangement and relation to other stages of purifying, that no dirt particles are allowed to pass through the charcoal with dirt and germ containing slush, thereby prolonging the life of the filter as well as rendering the filtering of water more hygenic and continuous; the various stages or layers in the purifier being also readily removable.

Another object of the invention is to provide a method and a filter of the character described in which the filtering action is accomplished by the employment of a plurality of filtering, purifying and clarifying elements or stages, one of which comprises a porous filter stone associated with a charcoal stage in an ingenuous and novel manner, so as to protect and prolong the life of the charcoal layer, and also be readily removable for cleaning or replacement.

Other objects and advantages are to provide a water filter that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing, wherein

Fig. 1 is a perspective view of a water dispenser unit assembled with a purifying device constructed in accordance with my invention, and Fig. 2 is a side view partly in section, showing the inner construction of my purifier and filter.

In the embodiment of the invention shown in the accompanying drawing, the filtering device 1 is detachably supported on a stand 2, below a water cooling and dispensing vessel 3. The vessel 3 is of the type known as an olla and has a valved discharge nozzle 4 at its lower end. The vessel 3 is placed on a tray 5, of the usual type, on the top of the stand 2.

The vessel 3 is covered by a dome-like top 6. A shank 7 of the top 6 fits into the open end of the vessel 3 to hold the top 6 in place. On the top 6 is an inlet 8 through which the vessel 3 may be filled with purified water.

The filtering and purifying device 1 is particularly adapted to be used in connection with pressure feed.

The method of purifying includes the passing of the water through a plurality of superposed layers of filtering and purifying materials, especially the conducting of the water through a dirt-particle removing filter, and a germ-proof, preferably slow filtering layer, before the water reaches the real purifying material, such as charcoal. Thus the dirt, and slushy particles usually present in the water, are not allowed to reach the charcoal and accumulate in the latter. The charcoal is thus preserved for its main function, namely to remove gases and chemicals from the water.

The purifying device 1 is confined in a housing having a removable top 9 secured thereon, and a frusto-conical bottom 10. There is an inlet chamber 11 inside the top 9, which is centrally located and includes a plurality of orifices 12 extended substantially sidewise through the walls of the inlet chamber 11. The bottom 13 of the inlet chamber 11 is preferably closed and covered.

In the apex of the frusto-conical bottom 10 is a threaded outlet opening 14 into which is secured an externally threaded end of a conduit 15. The other end of the conduit 15 is suitably connected to the inlet 8 on the vessel top 6. It is to be noted that the end of the conduit 15 extending through the opening 14, is closed and is provided with lateral, side orifices 16 to collect the water from the filter device. Thus there is a protective cage with side orifices formed both at the inlet and outlet of the device 1. It is also to be noted that these cages project into the respective layers within the housing 1.

In the housing of the device 1 between the aligned inlet 11 and outlet 14 are a plurality of superposed layers, arranged across the interior of the housing, substantially at right angles to the direction of the water flow from the inlet 11 to the outlet 14.

The top 9 of the device is formed with a cylindrical flange 17 extended into the open top of the housing of the device 1. This flange confines a cell filled with powder of asbestos, stone and the like powder filter; this layer 18 will be hereinafter referred to as a super filter cell. This super filter cell 18 is on top of a porous stone 19, preferably of the type commonly called "natural Tripoli stone". The stone 19 rests on a gasket 20, on a ledge or inwardly projecting annular flange 21, spaced from the top of the device 1. On the top of the stone 19 is placed another gasket 22, between the bottom of the flange 17 and the top of the stone 19.

Below the stone 19 is a substantially thick layer of gas and chemical remover or purifying material, preferably a charcoal layer 23, which latter is superposed on fibrous filter such as a layer of asbestos mineral fibre 24.

In the bottom of the device 1 and around the outlet orifices 16 is a clarifying agent or material such as a layer of crushed quartz 25.

It is optional to place another porous stone 26 between the fibre 24 and the quartz 25, but if placed therein, the same is made of such diameter as to be removable past the ledge or flange 21. This second stone 26 is supported on another annular ledge or flange 27 on the inside of the device 1, as shown in Fig. 2.

The inlet chamber 11 is connected through a check valve 28 to a water supply conduit 29, which latter may be connected to any usual water faucet. The check valve 28 is open for flow into the device 1, but prevents back flow therefrom, in the usual manner. Thus the flow is automatically stopped when the system is full of water.

A pair of spaced lugs 30 with angular holes 31 therethrough, are provided on one side of the device 1, to engage angular pin brackets 32 on a leg of the stand 2. Thus the device 1 is supported on the stand 2 in a readily detachable, yet in a secure manner.

In operation the water, usually under pressure, passes from the conduit 29 through the check valve 28 into the inlet chamber 11 and out through the side orifices 12 to the super filter cell 18, into which latter all dirt particles, and pieces of foreign material are deposited. The water thus cleared from foreign particles and dirt, seeps through the Tripoli stone 19. This porous stone transmits water but it positively prevents the carrying of any dirt particles from the cell 18. The particular Tripoli stone herein used is also germ-proof.

The water positively cleared from dirt particles, flows onto the charcoal layer 23, which removes gases and undesirable chemicals from the water, completely purifying the water. The fiber 24 filters the purified water, and the crushed quartz 25 then clarifies the transparency of the water, and causes it to sparkle, so that the water flowing into the vessel 3 is crystal clear.

The stone 26 when used, excludes any possible loose fiber particles from the purified water.

It will be recognized that the above described device efficiently operates under any water conditions. Most automatic pressure filters heretofore used, have a round stone center, with substantially concentric layers of charcoal, but such arrangement proved impractical, because the dirt deposited in the charcoal clogs the same in a very short time. Furthermore the slush, and dirt in the charcoal of such devices of the old type, are most unsanitary and the ultimate result is not the sparkling, clear water that is obtained through the device herein described.

The herein device does not require frequent cleaning, it assures continuous, uninterrupted operation, and longer life for the filter materials. Inasmuch as all the dirt particles are taken out before the water reaches the charcoal, it is not necessary to empty the whole device at periodical cleanings; it is sufficient to remove the super-filter cell 18, and to clean the stone 19. Thereafter the operation of the device is again efficient and continuous. It is also to be noted that the herein device provides for an arrangement of at least five filter mediums in a compact, and handy unit for pressure feed of water, which offers an economical and simple combination with any suitable vessel of the olla type.

Having thus described this invention, what I claim and desire to secure by Letters Patent is:

1. The combination with a purifier and filter device for filtering water under pressure, having a housing with an inlet and an outlet, a plurality of purifying and filtering stages arranged in superposed layers between the inlet and outlet; said stages including a layer of powdered filter material at the top, a porous stone below said layer, and charcoal below the stone, of a fibrous filter below the charcoal, a water clarifying material below the fibrous filter, and another porous stone between the fibrous filter and the water clarifying material.

2. The combination with a purifier and filter device for filtering water under pressure, having a housing with an inlet and an outlet, a plurality of purifying and filtering stages arranged in superposed layers between the inlet and outlet; said stages including a layer of powdered filter material at the top, a porous stone below said layer, and charcoal below the stone, of a fibrous filter below the charcoal, a water clarifying material below the fibrous filter, and another porous stone between the fibrous filter and the water clarifying material, said inlet discharging into the layer of powdered filter material, and the outlet leading from the said clarifying material.

3. In a filter and purifying device, the combination with a housing having a plurality of transverse filtering and purifying layers, and an outlet at the lowermost of said layers, the uppermost of said layers being a solid porous member, of a top on the housing, a flange extended from the top into the housing so as to form an inverted cup above said member, a powdered filtering material in said cup, an inlet in the top communicating with the cup, and a marginal packing element between the flange and said solid member.

4. In a filtering and purifying device having a housing, filtering and purifying layers in the housing, the uppermost layer being a solid, porous member of a top removably secured to the housing, an annular flange extended from the underside of the top and into the housing, onto the top surface of said solid member to form a downwardly open receptacle for a powdered filtering substance, an inlet chamber on the top extended into said receptacle and having a plurality of orifices on the side of the chamber.

5. In a filtering and purifying device for water under pressure the combination with a housing, a plurality of transverse filtering and purifying layers in the housing, of a porous stone forming one of said layers, a ledge on the inner periphery of the housing on which the stone rests, and marginal packing members between said ledge and the underside of the stone, and on the upper side of the stone to prevent the passing of water under pressure around the outer periphery of the stone, and means for pressing on the packings to prevent the leakage of water therearound.

6. In a filtering and purifying device for water under pressure the combination with a housing, a plurality of transverse filtering and purifying layers in the housing, of a porous stone forming one of said layers, a ledge on the inner periphery of the housing on which the stone rests, marginal packing members between said ledge and the underside of the stone, and on the upper side of the stone to prevent the passing of water under pressure around the outer periphery of the stone, and a top on the housing being adapted to exert a pressure on said packings.

7. In a pressure feed filtering and purifying device the combination with a housing, having an inlet and an outlet, a plurality of transverse filtering and purifying layers in the housing between the inlet and outlet of a removable, porous stone forming an intermediate layer, a layer of crushed quartz between the underside of the stone and the outlet, and a layer of fibrous material on the upper side of the stone, and means to prevent seepage of water around the edges of said stone.

JAMES E. MICHAUD.